(12) United States Patent
Sato et al.

(10) Patent No.: US 9,292,185 B2
(45) Date of Patent: Mar. 22, 2016

(54) DISPLAY DEVICE AND DISPLAY METHOD

(71) Applicant: PANASONIC CORPORATION, Osaka (JP)

(72) Inventors: Hiroyuki Sato, Kanagawa (JP); Tomohiro Iwama, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 231 days.

(21) Appl. No.: 14/164,471

(22) Filed: Jan. 27, 2014

(65) Prior Publication Data

US 2014/0253479 A1 Sep. 11, 2014

(30) Foreign Application Priority Data

Mar. 8, 2013 (JP) ................................ 2013-046838
Oct. 22, 2013 (JP) ................................ 2013-219071

(51) Int. Cl.
G06F 3/041 (2006.01)
G06F 3/0484 (2013.01)
G06F 3/0488 (2013.01)
G01C 21/36 (2006.01)

(52) U.S. Cl.
CPC .......... *G06F 3/04845* (2013.01); *G01C 21/367* (2013.01); *G01C 21/3664* (2013.01); *G06F 3/04842* (2013.01); *G06F 3/04847* (2013.01); *G06F 3/04883* (2013.01); *G06F 2203/04806* (2013.01)

(58) Field of Classification Search
None
See application file for complete search history.

(56) References Cited

U.S. PATENT DOCUMENTS

2011/0141144 A1 6/2011 Tomono

FOREIGN PATENT DOCUMENTS

| JP | 2008-287323 | 11/2008 |
|---|---|---|
| JP | 2010-44628 | 2/2010 |
| JP | 2011-204033 | 10/2011 |
| JP | 2011-243061 | 12/2011 |

OTHER PUBLICATIONS

Japan Notification of Reasons for Refusal, dated Mar. 11, 2014 along with an English translation thereof.
Japan Decision to Grant a Patent, mail date is Sep. 2, 2014.
U.S. Appl. No. 14/235,832 to Masayuki Yamamoto, which was filed Jan. 29, 2014.
U.S. Appl. No. 14/203,754 to Hiroyuki Sato et al., which was filed Mar. 11, 2014.
U.S. Appl. No. 14/125,353 to Hiroyuki Sato et al., which was filed Dec. 11, 2013.

*Primary Examiner* — Adam R Giesy
(74) *Attorney, Agent, or Firm* — Greenblum & Bernstein, P.L.C.

(57) ABSTRACT

Provided are a display device, and a display method which improve operability of a proximity operation and a contact operation by using an interface display such as a magnification adjustment-use interface. Provided is a display unit that includes a control unit, a storage unit, a display unit, a display processing unit, a sensor unit, a coordinate acquisition unit, a reference position determining unit, and a defined region determining unit. A user approximates an instruction medium to the display unit and closely holds the instruction medium, for example, in a portion to be enlarged on a map displayed on the display unit. The display processing unit which received detection signals by the sensor unit displays an interface in which enlargement is performed on the map in a proximity of an instruction medium based on the obtained position coordinates.

16 Claims, 12 Drawing Sheets

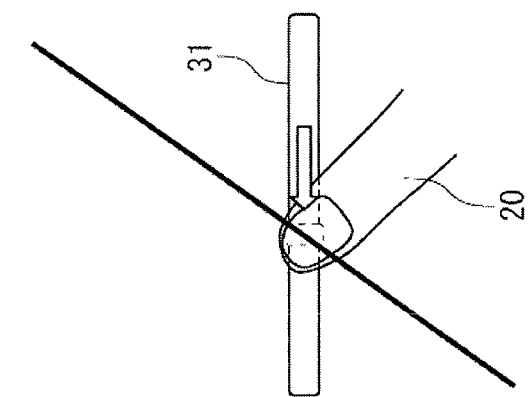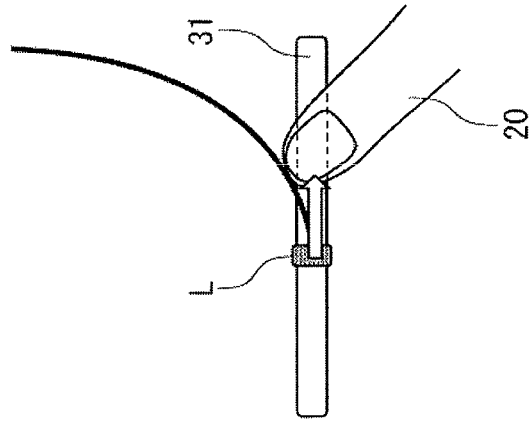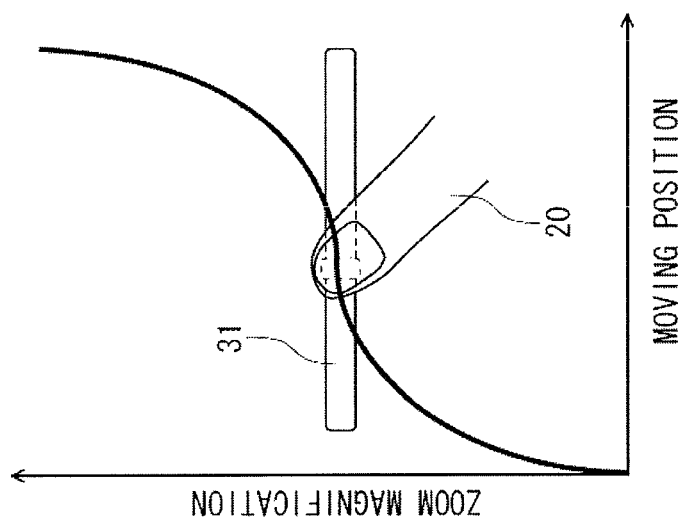

DISPLAY DEVICE AND DISPLAY METHOD

CROSS REFERENCE TO RELATED APPLICATIONS

This application is based on and claims the benefit of Japanese Patent Application No. 2013-046838 filed on Mar. 8, 2013, the contents of which are incorporated herein by reference in its entirety.

BACKGROUND

The present invention relates to a display device, which can be operated in a proximity of a display unit, and a display method.

Terminals which can be operated using a user interface (UI) on a display unit of a smartphone and the like have come into wide use, and a user can operate various types of information (including browser) displayed on the display unit using a finger or a pen device (stylus) or the like. There is a pinch-in and pinch-out and a double tap, which tap a zoom button, and the like as a zoom operation of enlarging or reducing the displayed information. However, a display device that can always satisfy operability such as zoom (magnification) adjustment or zoom position specification or the like is not provided.

With respect to the tap of the zoom button, it is possible to perform the magnification adjustment with one hand, but it is difficult to specify the zoom position. With respect to the pinch-in and pinch-out, it is possible to adjust the enlargement and specify the zoom position, but it is difficult to adjust the enlargement and specify the zoom position with one hand. With respect to the double tap, it is possible to perform the zoom of the specified position, but it is difficult to perform the enlargement adjustment.

In addition, in Patent Document JP-A-2008-287323, there is disclosed a screen that enlarges and displays a predetermined range around a proximity point position using a touch panel which detects a proximity or a contact of a finger that allows other input operations available is displayed. Then, it is possible to know which portion is enlarged in a proximity of a region which is enlarged and displayed or what a nature of the enlarged and displayed information is by displaying additional information related to the information in this area, in the document.

SUMMARY

In Patent Document JP-A-2008-287323, it is possible to perform an enlargement operation by detecting that the finger is in the proximity. However, there is a problem that a control of a reference point and the like cannot be performed when the enlarged position is specified or the enlarged region is selected.

The present invention is made in view of the above circumstances, and an object is to provide a display device, a display method, and a display program that improve operability of a proximity operation and a contact operation by using an interface display such as a magnification adjustment-use interface.

According to one aspect of the present invention, there is provided a display device comprising:

a display unit configured to display an image;

a sensor unit configured to detect an instruction medium which is approximated to the display unit;

a reference position determining unit configured to determine whether or not the instruction medium detected by the sensor unit indicates a predetermined position on the display unit within a predetermined distance for a predetermined time period or more with respect to the display unit, and determine the predetermined position as a reference position of a zoom display in a case where the instruction medium is determined to indicate the position; and a display processing unit configured to display a magnification adjustment-use interface on the display unit at the time of determining the reference position.

In the above display device, the display processing unit changes a display mode of the magnification adjustment-use interface depending on a distance between the instruction medium and the magnification adjustment-use interface.

The display device may further comprise:

a defined region determining unit configured to determine a predetermined range from the reference position as a defined region at the time of determining the reference position, wherein an operation of the magnification adjustment-use interface is disabled in a case where the instruction medium is moved to an outside of the defined region.

In the above display device, the operation of the magnification adjustment-use interface is disabled after a predetermined time period elapses from when the instruction medium is moved to an outside of the defined region.

In the display device, the operation of the magnification adjustment-use interface is disabled in a case where the instruction medium is deviated from the magnification adjustment-use interface after instruction medium performs an operation of the magnification adjustment-use interface.

According to another aspect of the present invention, there is provided a display device comprising:

a display unit configured to display an image;

a sensor unit configured to detect an instruction medium which is approximated to the display unit;

a reference position determining unit configured to determine whether or not the instruction medium detected by the sensor unit indicates a predetermined position on the display unit within a predetermined distance for a predetermined time period or more with respect to the display unit, and determine the predetermined position as a reference position of a specific operation in a case where the instruction medium is determined to indicate the position;

a display processing unit configured to display a predetermined interface on the display unit at the time of determining the reference position; and a defined region determining unit configured to determine a predetermined range from the reference position as a defined region at the time of determining the reference position, wherein an operation of the predetermined interface is disabled in a case where the instruction medium is moved to an outside of the defined region.

In the display device, the operation of the predetermined interface is disabled after a predetermined time period elapses from when the instruction medium is moved to an outside of the defined region.

A portable terminal device may comprise the display device according to any one of above.

According to another aspect of the present invention, there is provided a display method comprising:

a step of displaying an image on a display unit;

a step of detecting an instruction medium which is approximated to the display unit by a sensor unit;

a step of determining whether or not the instruction medium indicates a predetermined position on the display unit within a predetermined distance for a predetermined time period or more with respect to the display unit and determining the predetermined position as a reference position of a zoom display in a case where the instruction medium is determined to indicate the position; and a step of displaying a magnification adjustment-use interface on the display unit at the time of determining the reference position.

According to still another aspect of the invention, there is provided a display method comprising:

a step of displaying an image on a display unit;

a step of detecting an instruction medium which is approximated to the display unit by a sensor unit;

a step of determining whether or not the instruction medium detected by the sensor unit indicates a predetermined position on the display unit within a predetermined distance for a predetermined time period or more with respect to the display unit and determines the predetermined position as a reference position of a specific operation in a case where the instruction medium is determined to indicate the position;

a step of displaying a predetermined interface on the display unit at the time of determining the reference position;

a step of determining a predetermined range from the reference position as the defined region at the time of determining the reference position; and a step of disabling an operation of the predetermined interface in a case where the instruction medium is moved to an outside of the defined region.

According to the present invention, it is possible that a user performs a proximity operation or a contact operation with one hand, it is possible to easily perform a zoom display and the like in which a position specified by the user (reference position) is set as the center, and it is also possible to easily perform a fine adjustment of the zoom display and the like. In addition, it is possible to perform a position specification and the zoom display at the same time, and it is possible to eliminate an inconvenience of only one operation in a double tap or a zoom button by fixing the reference position. Then, since the operation of an interface (magnification adjustment-use interface) is performed at a position slightly away from the reference position, it is possible that the user performs an operation, which is visually advantageous, without the reference position being hidden by an instruction medium.

BRIEF DESCRIPTION OF THE DRAWINGS

FIG. 2A is a conceptual diagram of a proximity operation by an instruction medium on the display unit, FIG. 2B is a conceptual diagram of an interface displayed on the display unit, and FIG. 2C is a conceptual diagram in which the interface is operated by the instruction medium.

FIG. 3A is a conceptual diagram of determining the reference position, and FIG. 3B is a conceptual diagram of an operation of the interface displayed in the proximity of the reference position.

FIG. 4A is an operation button, FIG. 4B shows an operation bar, FIG. 4C is an operation arrow, and FIG. 4D shows an instruction button.

FIGS. 5A and 5B are example of an inter-position coordinates distance between the magnification adjustment-use interfaces and the instruction medium, where FIG. 5A shows a long distance, FIG. 5B shows a short distance, and FIGS. 5C and 5D are example of inter-proximity coordinates distance between the magnification adjustment-use interfaces and the instruction medium, FIG. 5C shows a long distance, FIG. 5D shows a short distance.

FIGS. 6A and 6B are example of a position relation between the inside of a defined region and the instruction medium, where FIG. 6A is the inside of the defined region and FIG. 6B is an outside of the defined region, and FIGS. 6C and 6D are example of time during which the instruction medium is separated from the defined region, FIG. 6C shows a time period shorter than a predetermined time period and FIG. 6D shows a predetermined time period or longer.

FIG. 7A shows an operation on the interface and FIG. 7B shows an operation at the outside of the interface.

FIGS. 9A to 9C are diagrams describing a change of an zoom magnification with respect to a moving amount of a lever, where FIG. 9A is a diagram showing a curve graph in which a value of the zoom magnification, with respect to the moving position of the lever, is plotted, FIG. 9B is a diagram showing a state where the instruction medium is mistakenly brought into contact with the lever and is moved in an arrow direct, and FIG. 9C is a diagram showing a state of returning to an original position along the arrow direction by bringing the instruction medium into contact with the lever after the operation of the FIG. 9B.

FIG. 11A shows a relation of the inter-position coordinates distance between the instruction medium and the interface, and FIG. 11B shows a relation of the inter-proximity coordinates distance between the instruction medium and the interface.

FIG. 12A shows a relation between the inside and the outside of the defined region, and FIG. 12B is a relation of time during which the instruction medium is separated from the defined region.

DETAILED DESCRIPTION OF EMBODIMENTS

Hereinafter, description will be given in detail with respect to a preferred embodiment of a display unit according to the present invention based on FIGS. 1 to 10.

Figure 1:
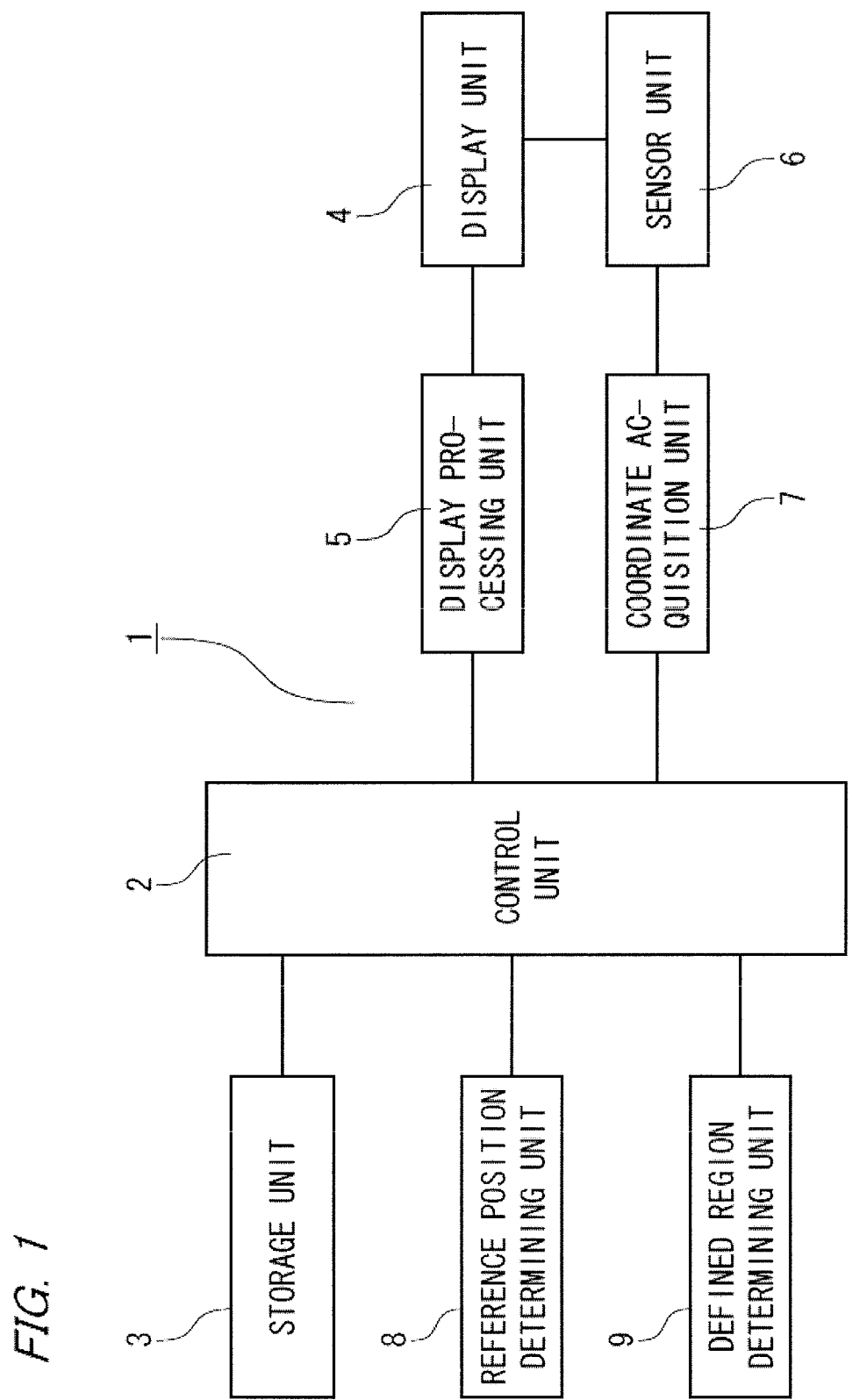
FIG. 1 is a block diagram showing an example of a hardware configuration of a display unit according to the present invention.

FIG. 1 is a block diagram showing an example of a hardware configuration of a display device according to the present invention.

The display device 1 of the present invention is, for example, is a cellular phone such as a smartphone or the like, a tablet, a portable terminal device such as a portable measuring instrument, a portable laptop, a digital camera, a meter and the like. A display device 1 includes a control unit 2, a storage unit 3, a display unit 4, a display processing unit 5, a sensor unit 6, a coordinate acquisition unit 7, a reference position determining unit 8, and a defined region determining unit 9.

The control unit 2 includes a microprocessor configuration having a CPU, a RAM, and a ROM and the like, performs a control (including calculation, search, and extraction, and the like) of the entire display device 1 by a control program which is stored in the ROM, and performs an execution control of various processing functions to be described later. The storage unit 3 is configured to have a recording medium using an optical recording medium such as a digital versatile disc (DVD) or the like, a hard disk, a non-volatile memory and may include an external storage medium.

The display unit 4 is configured to have a liquid-crystal panel and an organic EL panel and the like and includes a user interface (UI)-type display panel. The display processing unit 5 controls determination, movement, enlargement, and reduction of a display region such as various applications and images, which are displayed on the display unit 4. The sensor unit 6 detects a proximity (hover) operation and a contact (touch) operation of the instruction medium 20 such as a finger and a stylus to be described later, for example, by a capacitive type, a pressure-sensitive type, and an infrared-sensing type and the like. The coordinate acquisition unit 7 obtains position coordinates and proximity coordinates corresponding to the instruction medium 20 on the display unit 4 based on a motion (movement track) of the instruction medium 20 detected by the sensor unit 6.

The reference position determining unit 8 determines a reference position S to be described later based on the proximity coordinates and the position coordinates obtained from the position on the display unit 4 by the coordinate acquisition unit 7 and a distance from the display unit 4 to the instruction medium 20 detected by the sensor unit 6. The defined region determining unit 9 determines a predetermined range as a defined region T to be described later based on the reference position S determined by the reference position determining unit 8.

The above-described proximity (hover) operation indicates the operations such as movement and hold and the like of the instruction medium 20, in which the instruction medium 20 is approximated to the display unit 4, in a spatial position separated from the surface of the display unit 4. The contact (touch) operation indicates the operations in which the instruction medium 20 is brought into direct contact to the screen of the display unit 4 and touch, flick and pinch and the like are performed. The proximity coordinate is a spatial coordinate on the display unit 4 calculated based on a vertical separating distance between the display unit 4 surface and the instruction medium 20. The position coordinate is a coordinate of the display unit 4 corresponding to the position of the instruction medium 20.

Figure 2A:
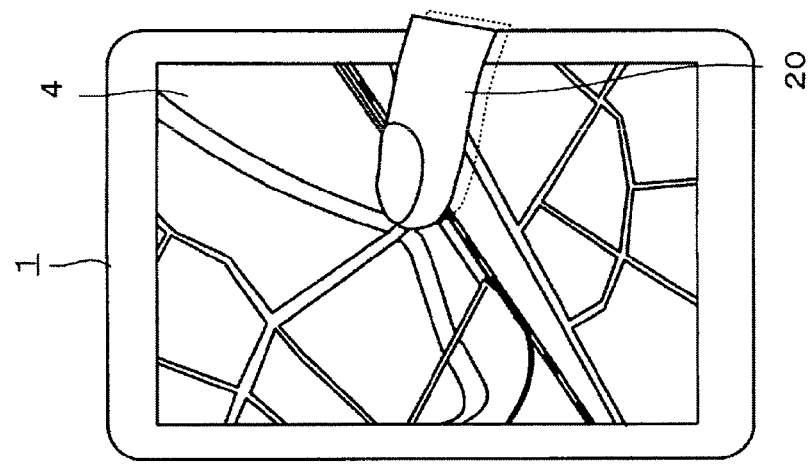
FIGS. 2A to 2C are diagrams showing an example of a first embodiment in an operation on the display unit according to the present invention, where
Figure 2B:
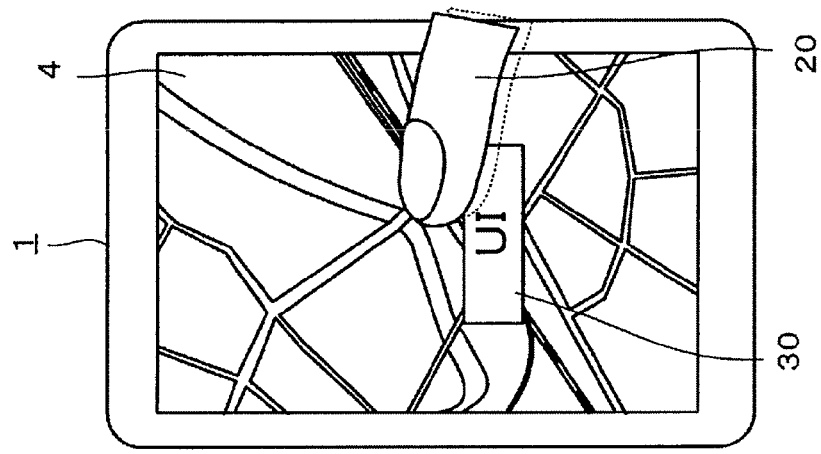
Figure 2C:
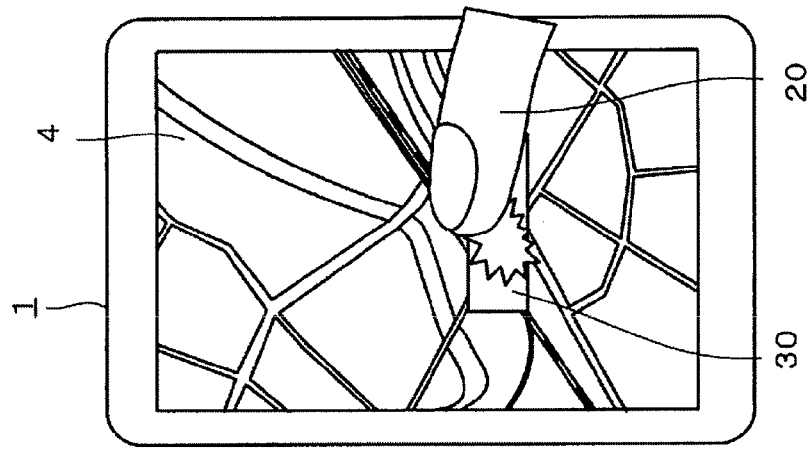

FIGS. 2A to 2C are diagrams showing an example of a first embodiment in an operation on the display unit according to the present invention, where FIG. 2A is a conceptual diagram of a proximity operation by an instruction medium on the display unit, FIG. 2B is a conceptual diagram of an interface displayed to the display unit, and FIG. 2C is a conceptual diagram in which the interface is operated by the instruction medium. Incidentally, the interface is abbreviated to "UI" in the drawing.

The user approximates the instruction medium 20 such as the finger or the stylus to the display unit 4, separates the instruction medium 20 from the display unit 4, for example, in a portion to be enlarged on a map displayed on the display unit 4, and makes a close hold (hover keep) state holding its position (refer to FIG. 2A).

A short dashed line of the instruction medium 20 represents a shadow of the instruction medium 20 and shows that the instruction medium 20 performs the proximity operation in the drawing. The proximity operation of instruction medium 20 is detected by the sensor unit 6, and the coordinate acquisition unit 7 obtains the proximity coordinates showing a separating distance between the display unit 4 and the instruction 20 and the position coordinates on the display unit 4. The display processing unit 5 received detection signals by the sensor unit 6 displays an interface 30 (refer to FIG. 2B) in which enlargement is performed on the map in the proximity of the instruction medium 20 based on the obtained position coordinates. It is possible that the user performs enlargement or reduction of the map on the interface 30 by the contact operations (refer to star-shaped polygon in drawing) such as touch, slide, and flick and the like (refer to FIG. 2C).

Figure 3B:
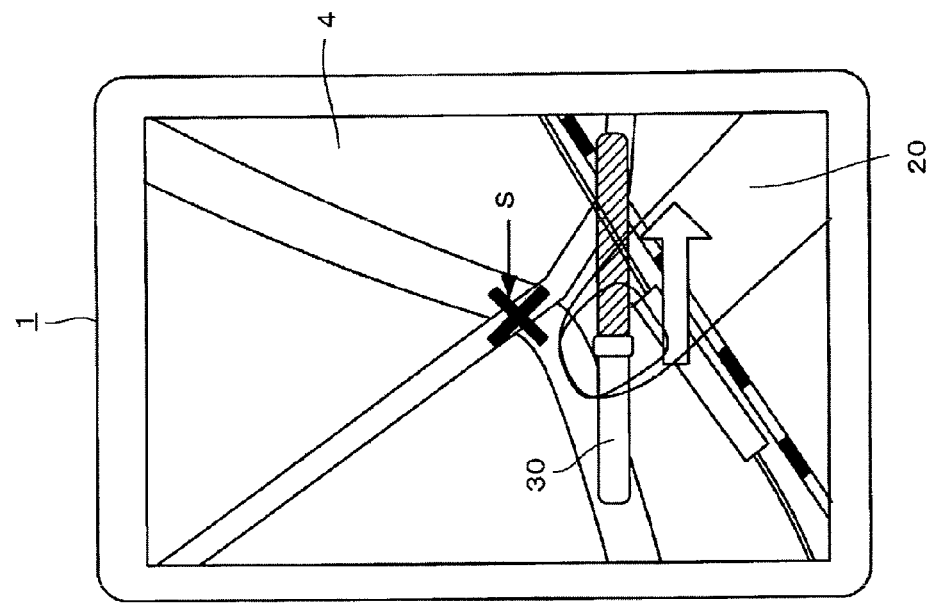
FIGS. 3A and 3B show a reference position in a close hold in the first embodiment, where
Figure 3A:
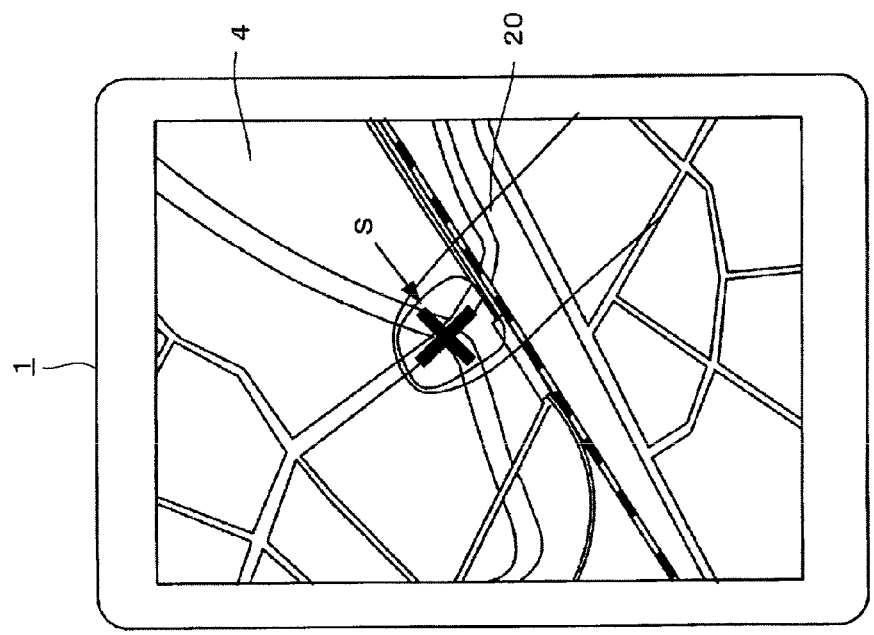

FIGS. 3A and 3B show a reference position in a close hold, where FIG. 3A is a conceptual diagram of determining the reference position, and FIG. 3B is a conceptual diagram of an operation of the interface displayed in the proximity of the reference position.

The user, for example, closely holds a spot to be enlarged using the map displayed on the display unit 4. In a case where the reference position determining unit 8 determines that the instruction medium 20 is closely held for a predetermined time period or more within a predetermined distance from the display unit 4, the display processing unit 5 displays the reference position S on the display unit 4 (refer to FIG. 3A "x" symbol). The interface 30 is displayed in the proximity of the reference position S in a state where the reference position S is displayed in the position specified by the user, and the user performs the enlargement of the map or the image around the reference position S as the center by operating the interface 30 (refer to FIG. 3B). Moreover, only the interface 30 may be displayed without displaying the reference position S. In addition, the contact operation is the main operation of the interface 30, but the proximity operation may be performed. Matter of subsequent writing is the same as the description according to operation of the following interface 30.

Figure 4A:
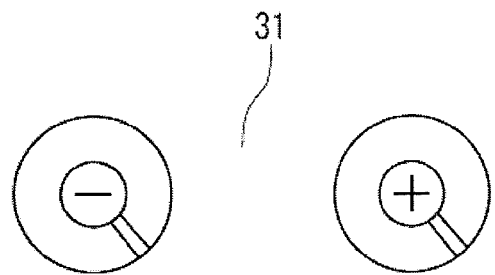
FIGS. 4A to 4D are schematic diagrams of an example of the interface displayed on the display unit, where
Figure 4B:
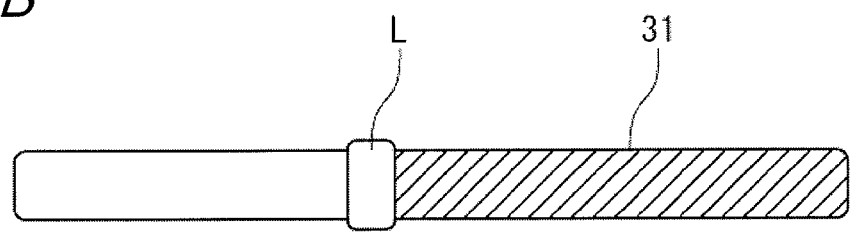
Figure 4C:
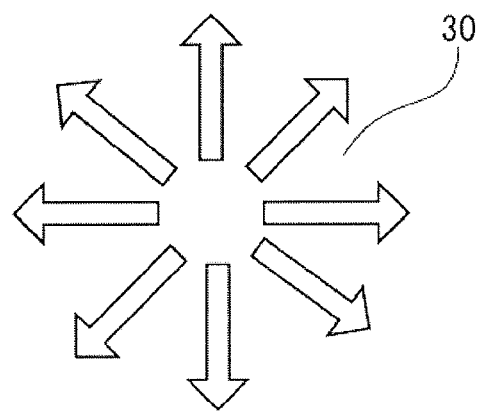
Figure 4D:
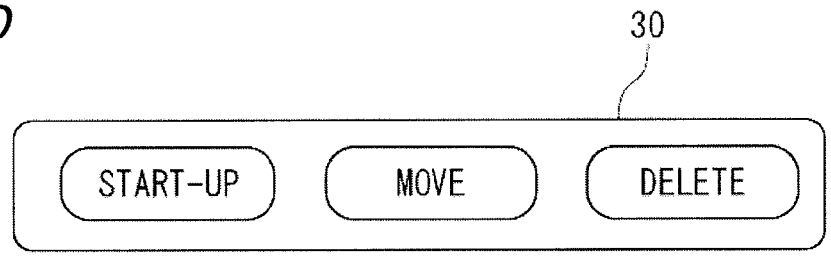

FIGS. 4A to 4D are schematic diagrams of an example of the interface displayed on the display unit, where FIG. 4A shows an operation button, FIG. 4B is an operation bar, FIG. 4C shows an operation arrow, and FIG. 4D shows an instruction button.

The interface 30 is an operation region where various icons, buttons, operation bars, and instruction buttons and the like are displayed, and it is possible to change various displays of enlargement or reduction or the like around the reference position S by the contact operation of the user. In addition, enlarging and reducing the map or the images or the like around the reference position S is referred to as the zoom display and the interface 30 to be used is referred to as a magnification adjustment-use interface 31.

FIGS. 4A and 4B are examples of the magnification adjustment-use interface 31. FIG. 4A is a button in which "−" or "+" is shown, and if the "−" button on a left side of the drawing is touched, the map or the image or the like are reduced. If the "+" button on a right side of the drawing is touched, the map or the image or the like are enlarged. FIG. 4B is an operation bar, the zoom display similar to the button of FIG. 4A is available, if a lever L is moved to the left side of the drawing, the map or the image or the like are reduced. If the lever L is moved to the right side of the drawing, the map or the image or the like are enlarged.

FIGS. 4C and 4D are examples of the interface 30 for specific operations. The interface 30 shown in FIG. 4C is an operation arrow. For example, it is possible to display the movement (scroll) of the map or the image or the like from the reference position S. The interface 30 displayed in FIG. 4D is an instruction button in which predetermined characters or the like are arranged. A plurality of icons for applications are displayed on the display unit 4, and if the user closely hold the desired icon, basic operations for icon arrangement, such as "start-up", "move", and "delete," are displayed.

A user can perform a proximity operation or a contact operation with one hand, can easily perform a zoom display in which a position specified by the user (reference position S) is set as the center, and can easily perform a fine adjustment of the zoom display and the like. In addition, it is possible to perform a position specification and the zoom display at the same time, resulting from fixing the reference position S, and therefore it is possible to eliminate an inconvenience of only one operation in a double tap or a zoom button. Then, since the operation of an interface 30 is performed at a position slightly away from the reference position S, it is possible that the user performs an operation, which is visually advantageous, without the reference position S being hidden by an instruction medium 20.

Figure 5A:
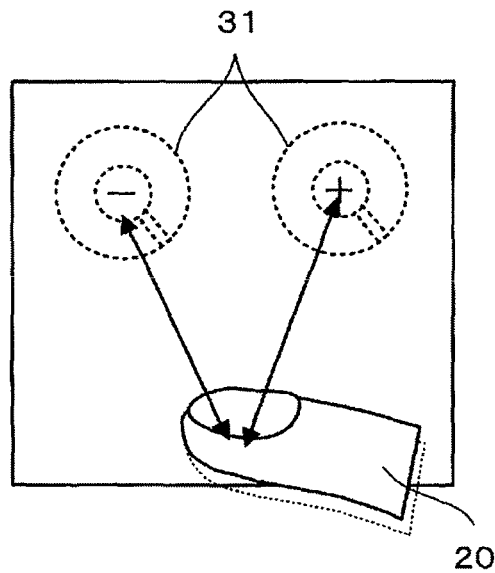
FIGS. 5A to 5D are conceptual diagrams of an example of a second embodiment in the operation on the display unit according to the present invention, where
Figure 5B:
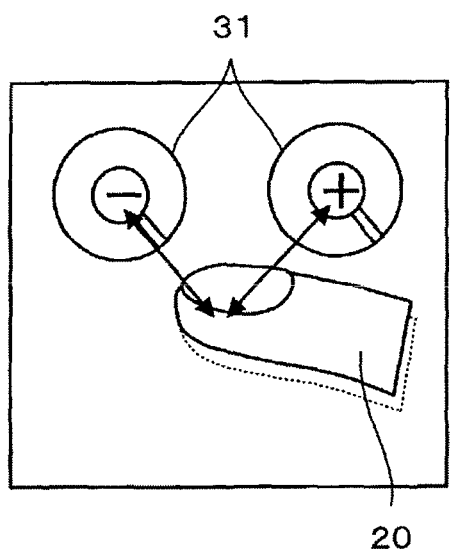
Figure 5C:
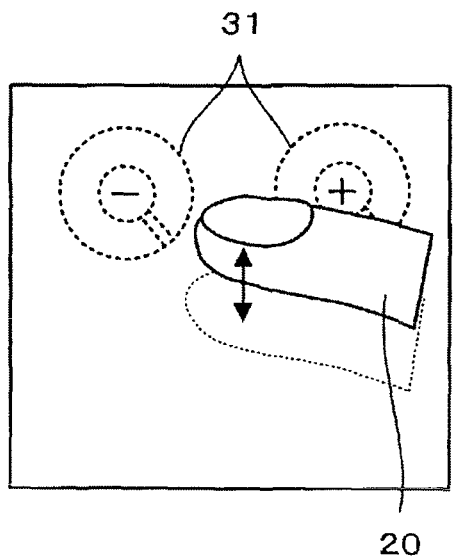
Figure 5D:
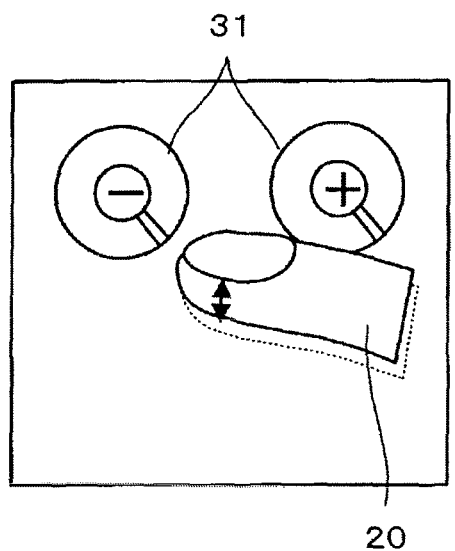

FIGS. 5A to 5D are conceptual diagrams of an example of a second embodiment in the operation on the display unit according to the present invention. FIGS. 5A and 5B are example of inter-position coordinates distance between the magnification adjustment-use interfaces and the instruction medium, where FIG. 5A shows a long distance, FIG. 5B shows a short distance, and FIGS. 5C and 5D show an example of inter-proximity coordinates distance between the magnification adjustment-use interfaces and the instruction medium, FIG. 5C is a long distance, FIG. 5D is a short distance.

The second embodiment shows that a display mode of the interface 30 is changeable by the relation between the proximity coordinates and the position coordinates and describes the magnification adjustment-use interface 31 as an example.

If the distance between the position coordinates of the magnification adjustment-use interface 31 and the position coordinates obtained from the instruction medium 20 becomes a predetermined distance or more, the display of the magnification adjustment-use interface 31 becomes thinner (refer to FIG. 5A). If the instruction medium 20 is brought close to the magnification adjustment-use interface 31, the display of the magnification adjustment-use interface 31 becomes thick (refer to FIG. 5B). In a case of light and shade in the drawing, a thin display is represented by the short dashed line, and a thick display is represented by a solid line. In addition, even though a distance between the position coordinates of the magnification adjustment-use interface 31 and the instruction medium 20 is within a predetermined distance, in a case where the proximity coordinate distance is a predetermined distance or more, the display of the magnification adjustment-use interface 31 becomes thin (refer to FIG. 5C) If the instruction medium 20 is brought close from a upper portion of the magnification adjustment-use interface 31, the display of the magnification adjustment-use interface 31 becomes thin (refer to FIG. 5D)

The change of the display mode of the interface 30 is described using the display of the light and shade but is not limited to this, it is possible to change a transparency, a size, a display color, and a shape. In addition, the change of the display mode may be continuous or may be gradual. It is possible that the user visually understands the position relation between the instruction medium 20 and the interface 30 and suppresses an erroneous operation by changing the display mode.

Figure 6A:
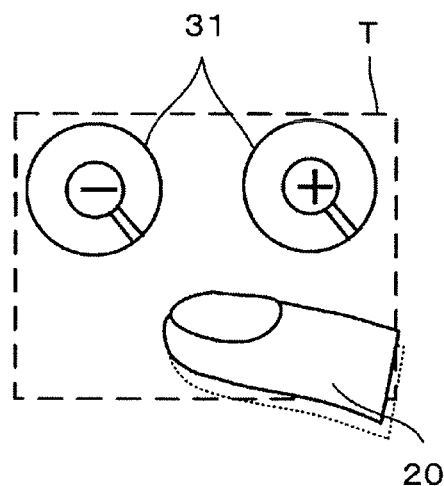
FIGS. 6A to 6D are conceptual diagrams of an example of a third embodiment in the operation on the display unit according to the present invention, where
Figure 6B:
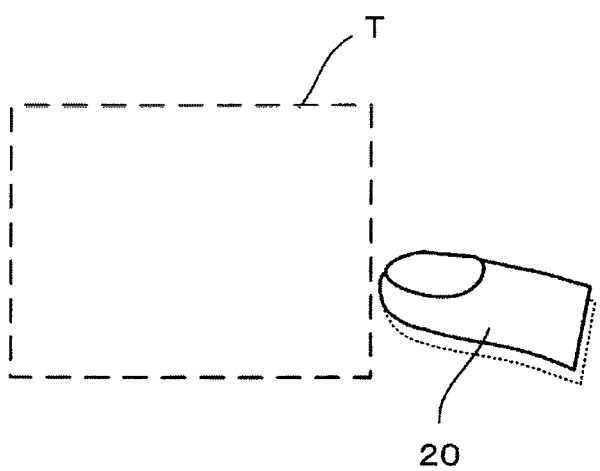
Figure 6C:
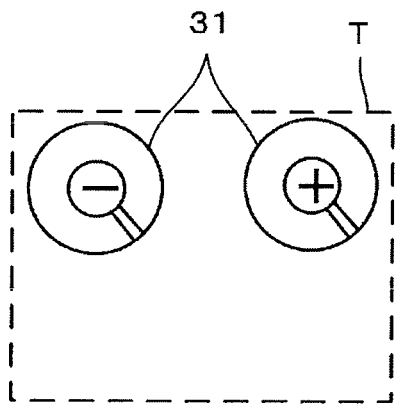
Figure 6D:
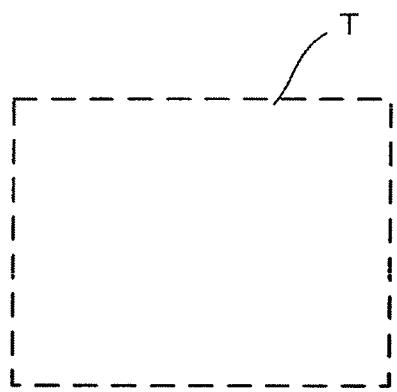

FIGS. 6A to 6D are conceptual diagrams of an example of a third embodiment in the operation on the display unit according to the present invention. FIGS. 6A and 6B show example of a position relation between the inside of a defined region and the instruction medium, where FIG. 6A shows the inside of the defined region and FIG. 6B shows an outside of the defined region, and FIGS. 6C and 6D are example based on a time since when the instruction medium is separated from the defined region, FIG. 6C shows less than a predetermined time period and FIG. 6D shows a predetermined time period or more.

The third embodiment shows that the interface 30 is displayed or is not displayed by the position relation between the defined region T (short dashed line box in drawing) and the instruction medium 20 and describes the enlargement magnification-use interface 31 as an example.

The defined region determining unit 9 determines the defined region T of a predetermined area such that the magnification adjustment-use interface 31 is surrounded. The defined region T may be within a predetermined range from the reference position S. Apart from the reference position S, which is determined first by the user, in a case where the zoom play is performed in other spots on another map, a disadvantage occurs as the magnification adjustment-use interface 31 remains to be displayed; therefore, defined region determining unit determines the defined region T of the contact operation.

In a case where the position coordinates obtained from the instruction medium 20 are in the defined region T, the magnification adjustment-use interface 31 is displayed (refer to FIG. 6A). In a case where the instruction medium 20 is moved and is deviated from the defined region T, the magnification adjustment-use interface 31 is, for example, not displayed and the operation becomes disabled (refer to FIG. 6B). In addition, even in a case where the instruction medium 20 is moved and is deviated from the defined region T, the magnification adjustment-use interface 31 is displayed when time duration is less than the predetermined time period (refer to FIG. 6C). In a case of a predetermined time period is passed, the magnification adjustment-use interface 31, for example, is not displayed, and the operation becomes disabled (refer to FIG. 6D)

Incidentally, the defined region T may be displayed on the display unit 4, and in a case of being displayed, the defined region T may not be displayed in FIGS. 6B and 6D. A predetermined time period is described, but is not particularly limited, the determination of less than a predetermined distance or a predetermined distance or more may be used. The above-described non-display means a complete deletion from the display unit 4.

The user freely changes, for example, map positions displayed on the display unit 4 by performing the display or the non-display or the like by providing the defined region T based on the motion of the instruction medium 20 and is released from the continuous display of the interface 30 based on each proximity operation. In addition, even in a case where the user mistakenly moves the instruction medium to the outside of the defined region T, if the time duration is within a predetermined time period, it is possible to achieve the return of the contact operation of the interface 30 by determining display time of the defined region T.

Figure 7B:
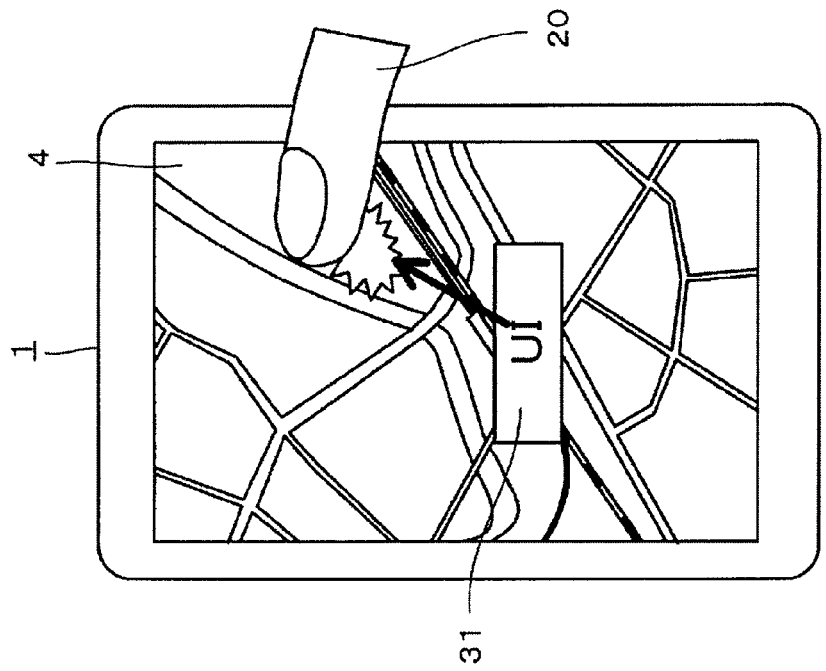
FIGS. 7A and 7B are conceptual diagrams showing an example of a fourth embodiment in the operation on the display unit according to the present invention, where
Figure 7A:
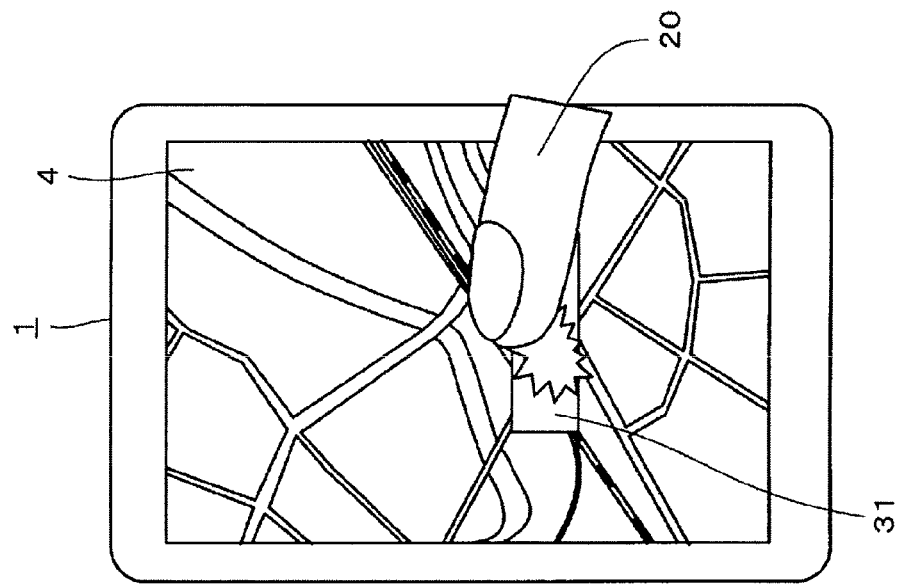

FIGS. 7A and 7B are conceptual diagrams showing an example of a fourth embodiment in the operation on the display unit according to the present invention. FIG. 7A is an operation on the interface, and FIG. 7B shows an operation at the outside of the interface, and describe the magnification adjustment-use interface as an example.

The user performs the contact operation of the magnification adjustment-use interface 31 for magnification adjustment (refer to FIG. 7A). If the user moves the instruction medium 20 in the position deviated from the magnification adjustment-use interface 31 in order to operate other spots on the map, the magnification adjustment-use interface 31 becomes disabled (refer to 7B). In addition, even in a case where the instruction medium 20 is simply separated from the magnification adjustment-use interface 31, the magnification adjustment-use interface 31 may become disabled. Furthermore, if the movement of the instruction medium 20 from the magnification adjustment-use interface 31 is within a predetermined distance or within a predetermined time period, it is possible to continue to perform the contact operation of the magnification adjustment-use interface 31.

In a case where the instruction medium 20 is deviated from the interface 30, even if the interface 30 is mistakenly brought into contact again, the interface does not malfunction by making the interface 30 disabled. Therefore, it is possible that the user continues the operation at ease. In addition, with respect to the movement from the interface 30, it is possible to achieve the return of the contact operation of the interface 30 by determining a threshold of the distance or the time.

On the other hand, when the user performs the contact operation of the magnification adjustment-use interface 31 (refer to FIG. 7A), a case where the instruction medium 20 is unintentionally separated from the magnification adjustment-use interface 31 regardless of the desire to continue the operation can be also conceivable. For this reason, in a case after the user performs the contact operation of the magnification adjustment-use interface 31 for constant time or at a constant distance, even though the contact operation is separated from the magnification adjustment-use interface 31, it is possible for consideration of a continued operation of the magnification adjustment-use interface 31 to be configured.

Figure 8:
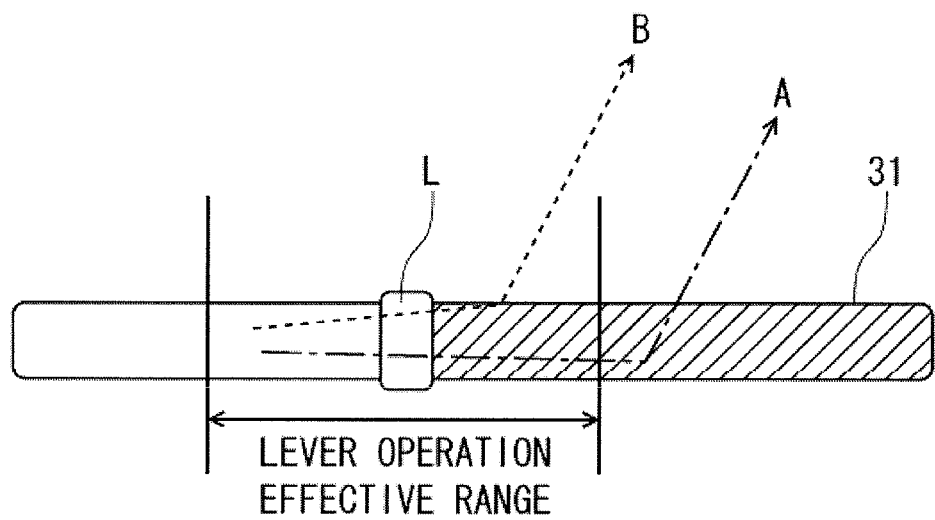
FIG. 8 is a diagram describing a definition of a lever operation effective range in the magnification adjustment-use interface, a lever operation exceeding the lever operation effective range by the instruction medium, and the lever operation in a range where the lever operation effective range is not exceeded.

For example, as shown in FIG. 8, a predetermined range (not particularly limited) from a stop position of a lever L of the magnification adjustment-use interface 31 is defined as a lever operation effective range. As shown in a dashed line arrow A, deviation from the magnification adjustment-use interface 31 is assumed after the lever L (slide) is operated such that instruction medium 20 exceeds the lever operation effective range in the magnification adjustment-use interface 31. In this case, the user is considered to intend for the operation of the magnification adjustment-use interface 31 to occur and, and the user can continue the lever operation.

On the other hand, as shown in a dashed line B, deviation from the magnification adjustment-use interface 31 is assumed after the lever L (slide) is operated such that instruction medium 20 does not exceed the lever operation effective range in the magnification adjustment-use interface 31. In this case, the user is not considered to intend for the operation of the magnification adjustment-use interface 31 to occur, and it is possible that the user migrates to another operation such an operation of a browser screen or the like without continuing the lever operation.

Furthermore, the user mistakenly performs the contact operation of the magnification adjustment-use interface 31, for example, the performance of an unintended zoom operation can be conceived. For this reason, it is possible to set a change amount of the zoom magnification to be small immediately after starting the contact operation, and gradually increase the change amount of the zoom magnification in accordance with duration of the contact operation. Moreover, in a case where the zoom operation in an opposite direction is performed during the zoom operation (for example, reduction direction from enlargement direction), it is desirable to attain a constant change rather than a gradual change in the zoom magnification in order to improve response characteristics.

FIG. 9 is an explanatory diagram of the above-described matters. FIG. 9A is a diagram showing a curve graph in which a value of the zoom magnification, which is with respect to the moving amount of the lever L, is plotted. The change amount (slope of curve graph) of the zoom magnification is small in the proximity of the stop position of the lever L, but the change amount of the zoom magnification increases as the lever separates from the stop position. Accordingly, as shown in FIG. 9B, even in a case where the user mistakenly brings the instruction medium 20 into contact with the lever L and moves the instruction medium in an arrow direct, since the zoom magnification is difficult to increase immediately after the instruction medium is moved, it is possible to suppress an adverse effect due to the unintentional operation. In addition, as shown in FIG. 9C, in a case of returning to an original position along the arrow direction by bringing the instruction medium 20 into contact with the lever L after the operation of the FIG. 9B (case of folding), the change amount of the zoom magnification is constant, that is, the zoom magnification is set to change along a straight line. It is possible to improve the reaction of the zoom by such a setting.

Figure 10:
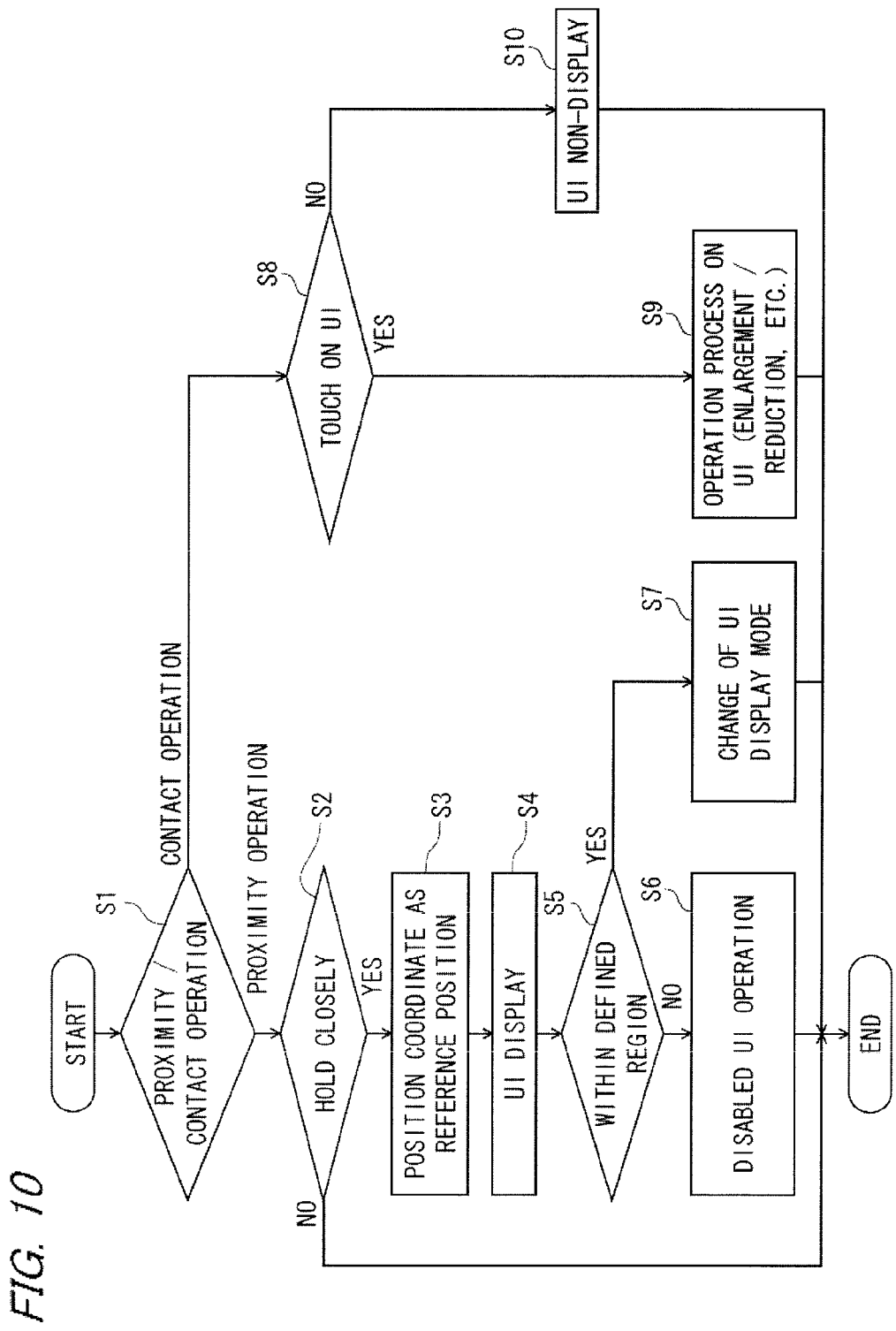
FIG. 10 is a flow chart diagram of an example of a flow of the operation of the present invention.

FIG. 10 is a flow chart diagram of an example of a flow of the operation of the present invention.

The sensor unit 6 determines whether or not the instruction medium 20 performs the proximity operation or the contact operation (step S1). The coordinate acquisition unit 7 obtains the proximity coordinates and the position coordinates if the instruction medium performs the proximity operation and obtains only the position coordinates if the instruction medium performs the contact operation. In a case where the sensor unit 6 determines that the instruction medium performs the proximity operation (step S1 is proximity operation), the control unit 2 determines whether or not the instruction medium 20 is closely held (step S2). In a case where the control unit 2 determines that the instruction medium is not closely held (step S2 is No), the process is ended. In a case where the control unit 2 determines that the instruction medium is closely held (step S2 is Yes), the reference position determining unit 8 determines the position coordinate as the reference position S and notifies the control unit 2 (step S3). The control unit 2 commands a display execution of the reference position S to the display processing unit 5, and the reference position S is displayed on the display unit 4. Then, the control unit 2 selects the predetermined interface 30 that matches the contact operation of start-up software and commands the display execution of the selected interface 30 to the display processing unit 5 at the same time when the reference position S is determined. The display processing unit 5 displays the interface 30 on the display unit 4 in the proximity of the reference position S (step S4).

The defined region determining unit 9 determines the defined region T when the reference position S is determined by the reference position determining unit 8. The defined region T may be in a predetermined range from the reference position S and may be the predetermined region surrounding the interface 30. The control unit 2 determines whether or not the instruction medium 20 is present in the defined region T based on the proximity coordinates and the position coordinates (step S5). In a case where the instruction medium is not present in the defined region T (step S5 is No), the control unit 2 disables the operation of the interface 30 (step S6), and the process is ended. In addition, in a case where the control unit 2 determines that the instruction medium is present in the defined region T (step S5 is Yes), the display processing unit 5 changes the display mode of the interface 30 (step S7), and the process is ended. Moreover, description will be given with respect to the change of the display mode later using FIG. 11.

In a case where the sensor unit 6 determines the instruction medium performs the contact operation (step S1 is contract operation), the sensor unit 6 determines whether or not the instruction medium 20 is in contact with the interface 30 (step S8). In a case where the sensor unit 6 determines the instruction medium 20 is in contact with the interface 30 (step S8 is Yes), the control unit 2 performs the operation process of the interface 30 (step S9), and the process is ended. In a case where the sensor unit determines that the instruction medium is not in contact with the interface 30 (step S8 is No), the display processing unit 5 does not display interface 30 (step S10), and the process is ended.

Figure 11A:
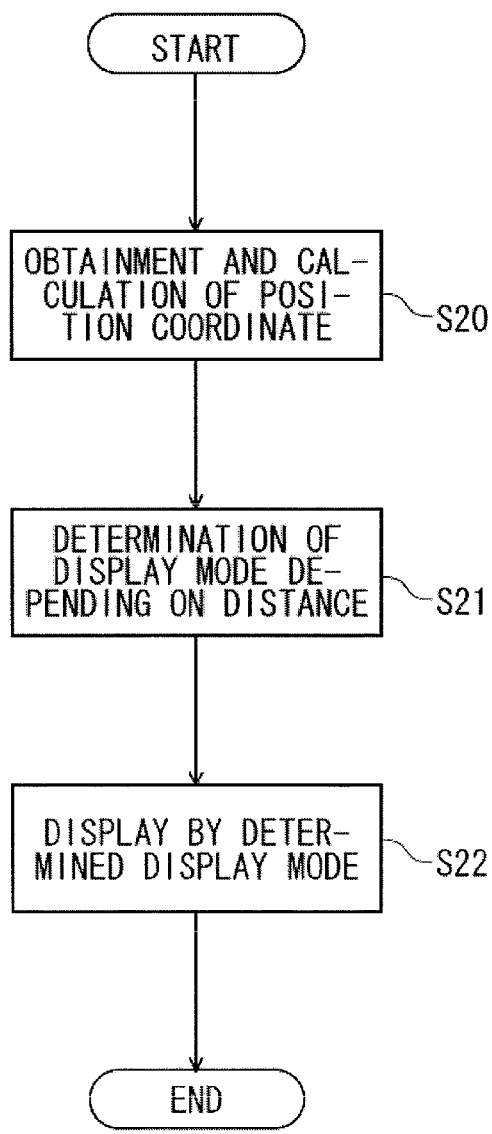
FIGS. 11A and 11B are flow chart diagrams showing an example of a flow of the operation based on the second embodiment of the present invention, where
Figure 11B:
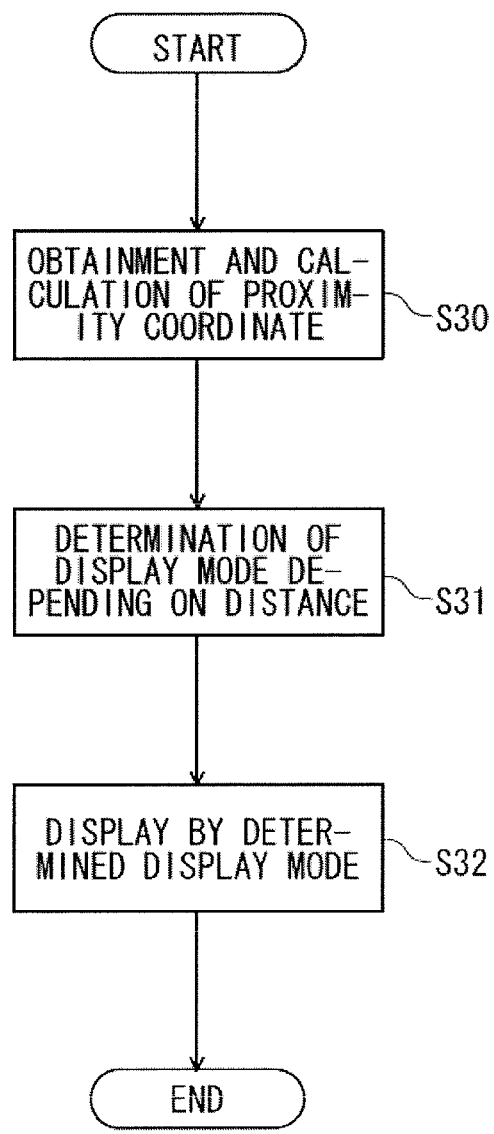

FIGS. 11A and 11B are flow chart diagrams showing an example of a flow of the operation based on the second embodiment (FIGS. 5A and 5B). FIG. 11A shows a relation of the inter-position coordinates distance between the instruction medium and the interface (corresponding to FIG. 5A), and FIG. 11B shows a relation of the inter-proximity coordinates distance between the instruction medium and the interface (corresponding to FIG. 5B).

The coordinate acquisition unit 7 obtains the position coordinates of the instruction medium 20 and the position coordinates of the interface 30 and calculates the distance between the two by the control unit 2 (step S20). The display processing unit 5 determines the display mode of the interface 30 depending on the distance between the two (step S21). The display processing unit 5 displays the interface 30 on the display unit 4 by the display mode based on the determination (step S22), and the process is ended.

The coordinate acquisition unit 7 obtains the proximity coordinates of the instruction medium 20 and calculate the distance between the screen of the display unit 4 and the instruction medium 20 (step S30) by the control unit 2. The display processing unit 5 determines the display mode of the interface 30 depending on the calculated distance (step S31). The display processing unit 5 displays the interface 30 on the display unit 4 by the display mode based on the determination (step S32), and the process is ended.

Figure 12A:
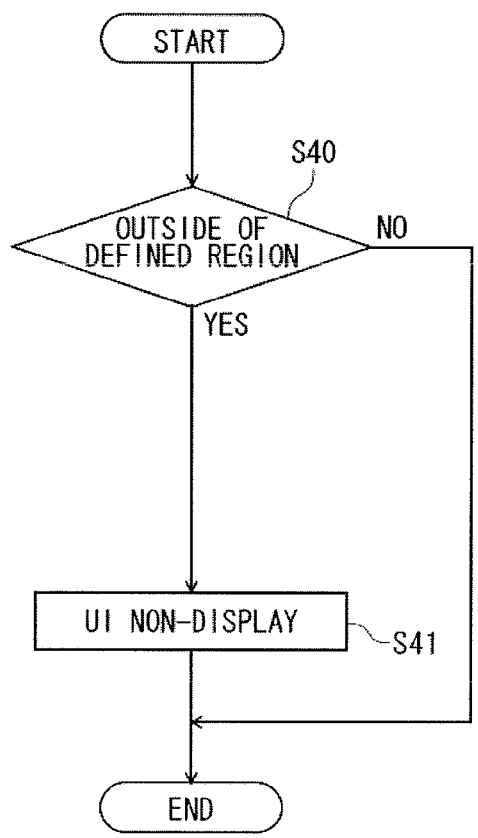
FIGS. 12A and 12B are flow chart diagrams showing an example of the flow of the operation based on the third embodiment of the present invention, where
Figure 12B:
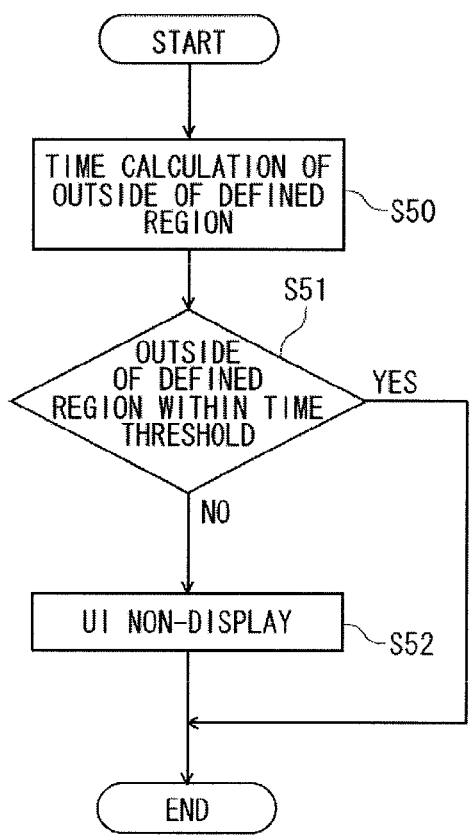

FIGS. 12A and 12B are flow chart diagrams showing an example of the flow of the operation based on the third embodiment (FIGS. 6A and 6B), where FIG. 12A shows a relation between the inside and the outside of the defined region (corresponding to FIG. 6A), and FIG. 12B is a relation of time during which the instruction medium is separated from the defined region (corresponding to FIG. 6B).

The control unit 2 determines whether or not the instruction medium 20 is present at the outside of the defined region T (step S40). In a case where the instruction medium is determined to be present at the outside of the defined region T (step S40 is No), the display processing unit 5 does not display the interface 30 in order to disable the operation of the interface 30 (step S41), and the process is ended. In addition, in a case where the instruction medium is determined not to be present at the outside of the defined region T (step S40 is No), the process is ended.

The control unit 2 calculates the time during which the instruction medium 20 is moved at the outside of the defined region T (step S50). The control unit 2 determines whether or not the calculated time is within a predetermined time period (step S51). In a case where the calculated time is determined not to be within a predetermined time period (step S51 is No), the display processing unit 5 does not display the interface 30 in order to disable the operation of the interface 30 (step S52), and the process is ended. In addition, in a case where the calculated time is determined to be within a predetermined time period (step S51 is Yes), the process is ended.

Incidentally, the present invention is not limited to the above-described embodiments and can be appropriately modified, and improved. In addition, a material, a shape, a dimension, a numeric value, and a placement point, and the like of the configuration component in the above-described embodiments are arbitrary and are not limited thereto as long as it can achieve the present invention.

A display unit, and a display method according to the present invention perform a proximity operation on a display unit such as a cellular phone, a tablet, and a laptop computer, and the like and are applicable for use for performing a zoom play such as a map, an image or the like or moving or the like by performing a contact operation of an interface displayed in the proximity of the proximity operation.

What is claimed is:

1. A display device comprising:
 a display unit configured to display an image;
 a sensor unit configured to detect an instruction medium which is approximated to the display unit;
 a reference position determining unit configured to determine whether or not the instruction medium detected by the sensor unit is in a predetermined position on the display unit, in a close state in which the instruction medium is distant within a predetermined distance from the display unit for a predetermined time period or more, and determine the predetermined position as a reference position of a zoom display in a case where the instruction medium is determined to be in the close state; and
 a display processing unit configured to display a magnification adjustment-use interface on the display unit at the time of determining the reference position.

2. The display device according to claim 1,
 wherein the display processing unit changes a display mode of the magnification adjustment-use interface depending on a distance between the instruction medium and the magnification adjustment-use interface.

3. The display device according to claim 1, further comprising:
 a defined region determining unit configured to determine, as a defined region, a predetermined range including the reference position and defined in a parallel direction with respect to the display unit at the time of determining the reference position,
 wherein an operation of the magnification adjustment-use interface is disabled in a case where the instruction medium is moved to an outside of the defined region with the close state kept.

4. The display device according to claim 3,
 wherein the operation of the magnification adjustment-use interface is disabled after a predetermined time period elapses from when the instruction medium is moved to an outside of the defined region.

5. The display device according to claim 1,
 wherein the operation of the magnification adjustment-use interface is disabled in a case where the instruction medium is deviated from the magnification adjustment-use interface after the instruction medium performs an operation of the magnification adjustment-use interface.

6. The display device according to claim 5, wherein the operation of the magnification adjustment-use interface by the instruction medium does not exceed a predetermined range.

7. The display device according to claim 1, wherein a change amount of the magnification is set to be small immediately after the operation of the magnification adjustment-use interface by the instruction medium, and the change amount of the magnification is increased in accordance with duration of the operation.

8. The display device according to claim 7, wherein in a case where an operation of the magnification adjustment-use interface by the instruction medium in an opposite direction to a direction in which the operation of the magnification adjustment-use interface is performed, the change amount of the magnification is set to be constant.

9. A portable terminal device comprising:
the display device according to claim 1.

10. A display device comprising:
a display unit configured to display an image;
a sensor unit configured to detect an instruction medium which is approximated to the display unit;
a reference position determining unit configured to determine whether or not the instruction medium detected by the sensor unit is in a predetermined position on the display unit, in a close state in which the instruction medium is distant within a predetermined distance from the display unit for a predetermined time period or more, and determine the predetermined position as a reference position of a specific operation to the display unit in a case where the instruction medium is determined to be in the close state;
a display processing unit configured to display a predetermined interface regarding the specific operation on the display unit at the time of determining the reference position; and
a defined region determining unit configured to determine, as a defined region, a predetermined range including the reference position and defined in a parallel direction with respect to the display unit at the time of determining the reference position,
wherein an operation of the predetermined interface is disabled in a case where the instruction medium is moved to an outside of the defined region.

11. The display device according to claim 10,
wherein the operation of the predetermined interface is disabled after a predetermined time period elapses from when the instruction medium is moved to an outside of the defined region.

12. A portable terminal device comprising:
the display device according to claim 10.

13. A display method comprising:
a step of displaying an image on a display unit;
a step of detecting an instruction medium which is approximated to the display unit by a sensor unit;
a step of determining whether or not the instruction medium is in a predetermined position on the display unit, in a close state in which the instruction medium is distant within a predetermined distance from the display unit for a predetermined time period or more and determining the predetermined position as a reference position of a zoom display in a case where the instruction medium is determined to be in the close state; and
a step of displaying a magnification adjustment-use interface on the display unit at the time of determining the reference position.

14. A display method comprising:
a step of displaying an image on a display unit;
a step of detecting an instruction medium which is approximated to the display unit by a sensor unit;
a step of determining whether or not the instruction medium detected by the sensor unit is in a predetermined position on the display unit, in a close state in which the instruction medium is distant within a predetermined distance from the display unit for a predetermined time period or more determining the predetermined position as a reference position of a specific operation to the display unit in a case where the instruction medium is determined to be in the close state;
a step of displaying a predetermined interface regarding the specific operation on the display unit at the time of determining the reference position;
a step of determining, as a defined region, a predetermined range including the reference position and defined in a parallel direction with respect to the display unit at the time of determining the reference position; and
a step of disabling an operation of the predetermined interface in a case where the instruction medium is moved to an outside of the defined region.

15. At least one non-transitory computer-readable medium that stores an executable computer program which, when executed by a computer, causes the computer to execute operations comprising:
displaying an image on a display;
detecting an instruction medium which is approximated to the display by a sensor;
determining whether or not the instruction medium is, in a predetermined position on the display, in a close state in which the instruction medium is distant within a predetermined distance from the display for a predetermined time period or more, and determining the predetermined position as a reference position of a zoom display in a case where the instruction medium is determined to be in the close state; and
displaying a magnification adjustment-use interface on the display at the time of determining the reference position.

16. At least one non-transitory computer-readable medium that stores an executable computer program which, when executed by a computer, causes the computer to execute operations comprising:
displaying an image on a display;
detecting an instruction medium which is approximated to the display by a sensor;
determining whether or not the instruction medium detected by the sensor is, in a predetermined position on the display, in a close state in which the instruction medium is distant within a predetermined distance from the display for a predetermined time period or more and determining the predetermined position as a reference position of a specific operation to the display in a case where the instruction medium is determined to be in the close state;
displaying a predetermined interface regarding the specific operation on the display at the time of determining the reference position;
determining, as a defined region, a predetermined range including the reference position and defined in a parallel direction with respect to the display at the time of determining the reference position; and
disabling an operation of the predetermined interface in a case where the instruction medium is moved to an outside of the defined region.

* * * * *